April 26, 1960 W. WILD ET AL 2,934,724
HIGH-FREQUENCY WAVE TRANSMISSION LINE OF LOW ATTENUATION
Filed April 26, 1955 3 Sheets-Sheet 1

Inventors
Walter Wild
Walter Eberl
Georg Demmel

April 26, 1960  W. WILD ET AL  2,934,724
HIGH-FREQUENCY WAVE TRANSMISSION LINE OF LOW ATTENUATION
Filed April 26, 1955  3 Sheets-Sheet 2
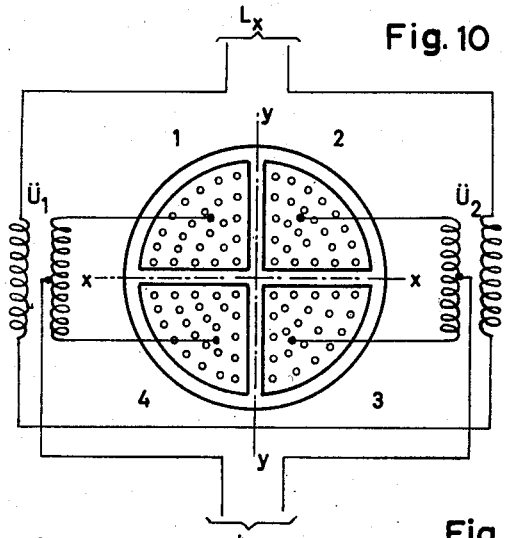
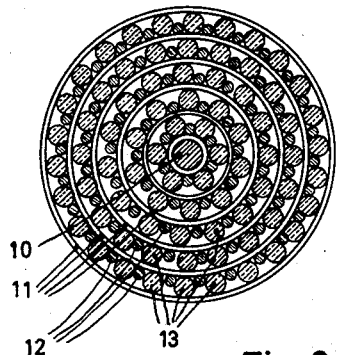
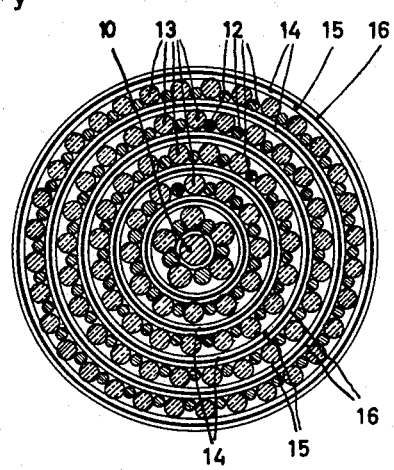
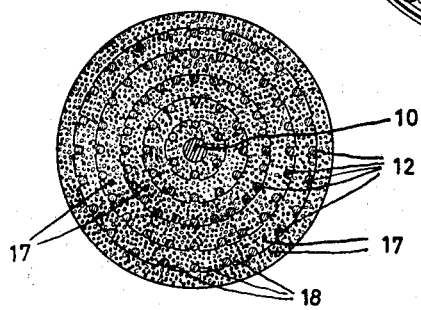
Inventors:
Walter Wild
Walter Eberl
Georg Klemmel April 26, 1960   W. WILD ET AL   2,934,724
HIGH-FREQUENCY WAVE TRANSMISSION LINE OF LOW ATTENUATION
Filed April 26, 1955   3 Sheets-Sheet 3

Inventors:
Walter Wild
Walter Eberl
Georg Demmel

United States Patent Office 2,934,724
Patented Apr. 26, 1960

2,934,724

HIGH-FREQUENCY WAVE TRANSMISSION LINE OF LOW ATTENUATION

Walter Wild, Munich, Walter Eberl, Berlin-Wilmersdorf, and Georg Demmel, Berlin-Siemensstadt, Germany, assignors to Siemens & Halske Aktiengesellschaft, Berlin-Siemensstadt, Germany, a corporation of Germany Application April 26, 1955, Serial No. 503,918

Claims priority, application Germany April 30, 1954

1 Claim. (Cl. 333—95)

Our invention relates to high-frequency wave transmission lines and, in a more particular aspect, to transmission lines of the laminated type.

There are known laminated high-frequency transmission lines composed of alternating thin laminations of metal and insulating material. The thickness of the individual metal laminations must be smaller than that of the equivalent conductance layer to prevent the occurrence of current displacement within the metal laminations. According to calculation, minimum attenuation is obtained if the thickness of the individual metal laminations is about twice the thickness of the insulating laminations. The metallic and insulating laminations are stacked coaxially or in planar layers. In both cases, the wave guiding structure is a completely or nearly completely laminated medium. Instead of designing the metal laminations as completely coherent and uniformly dense layers, it is also known to compose each layer of a multiplicity of insulated metal wires placed close to each other. If the known rule of giving each metal-layer twice the thickness of the insulating layer were to be applied to such laminations formed of insulated wires, then the thickness of the insulating coating on each individual wire would have to be one-quarter of the metal-layer thickness. Consequently, all known designs of this type of high-frequency conductors require extremely thin insulating layers and also an extremely small spacing between the metal laminations and between the wires of each lamination. The filling degree or volumetric amount of metal is correspondingly very large. This involves an appreciable amount of attenuation of the wave energy transmitted through such a line and also imposes a limitation upon the transmittable band of frequencies.

Relating generally to high-frequency wave transmission lines of the above-mentioned type, it is an object of our invention to provide a multi-layer laminated line that affords a lower and nearly constant attenuation over a wider range of frequencies.

Another object of our invention is to make a single wave transmission line of the above-mentioned type suitable for the simultaneous operation of a plurality of independent transmission circuits.

Our invention, aiming at these objects, is predicated upon the fact that the calculations resulting in the above-mentioned known rule of dimensioning for laminated wave guides are valid only if the metal-lamination thickness is very small relative to the conductance layer thickness. With an increase in frequency, however, the concurrent increase in attenuation becomes larger with an increased volumetric amount of metal. Now, we have found that the criterion decisive for the frequency characteristic of the attenuation is the coupling impedance of the individual conductor or wave-guide elements of which the transmission line is composed; and according to the invention, we arrange and dimension these elementary conductors so that their coupling impedance has a frequency characteristic equal or approximately equal to that of the complex high-frequency impedance. Such a transmission line secures constant minimum attenuation over a wider frequency range than otherwise applicable.

The invention will be more fully described with reference to the embodiments exemplified by the drawings in which Figs. 1 and 2 are explanatory and show schematically part of a laminated transmission line in longitudinal section and cross section respectively, and Fig. 3 is an explanatory diagram relating to such a line.

Figs. 4, 5 and 6 show cross sections of three transmission cables respectively.

Fig. 10 shows schematically and in cross section an embodiment of a laminated transmission line for multi-circuit operation.

Figure 1:
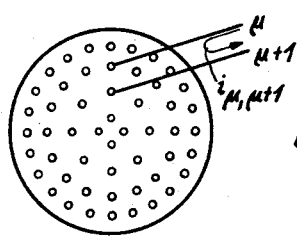
Figure 2:
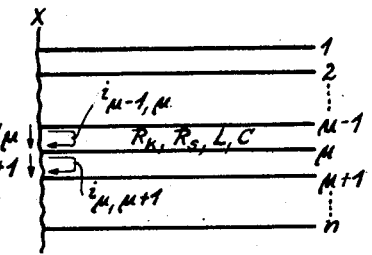

The laminated transmission line schematically represented in Figs. 1 and 2 has a multiplicity of coaxial conductor layers alternating with insulating layers. Each conductor layer is composed of individual longitudinal conductors. For the purpose of the following mathematical presentation of the features essential to our invention, such a conductor is looked upon as being composed of individual elementary wave guides stacked one upon, or one within the other, so that each individual metallic conductor forms part of two adjacent elementary wave guides and couples these two guides with each other through its coupling impedance ($R_k$). Consequently, the laminated transmission line, having a total of $n$ metal layers, is considered as forming a network of $n-1$ twin conductors. Two adjacent conductor layers or laminae $\mu$ and $\mu+1$ form together with the intermediate insulating layer a wave guide in which at any location $x$ there is a current $i_{\mu,\mu+1}(x)$ and a voltage $u_{\mu,\mu+1}(x)$. The layers $\mu$ and $\mu+1$ also form conductors for the two adjacent elementary wave guides in which the respective currents $i_{\mu-1,\mu}$ and $i_{\mu+1,\mu+2}$ are flowing. Let $R_s$ denote the complex impedance of the conductor layer itself (transmission impedance), $R_k$ the coupling impedance of the layer, and $L$, $C$ the external inductance and capacitance respectively of the elementary wave guide, then the following differential equations will result from the circuit equivalent of the elementary wave guide for sinusoidal excitation:

$$-\frac{du_{\mu,\mu+1}}{dx}=i_{\mu,\mu+1}(2R_s+j\omega L)-R_k(i_{\mu-1,\mu}+i_{\mu+1,\mu+2}) \quad (1)$$

$$-\frac{di_{\mu,\mu+1}}{dx}=u_{\mu,\mu+1}j\omega C \quad (2)$$

From the condition for reflectionless propagation:

$$i_{\mu,\mu+1}=I_{\mu,\mu+1}e^{-\gamma x} \quad (3)$$

we obtain the equation:

$$I_{\mu-1,\mu}-2cI_{\mu,\mu+1}+I_{\mu+1,\mu+2}=0 \quad (4)$$

wherein $2c$ is used as an abbreviation of $$\frac{2R_s+j\omega L}{R_k}-\frac{\gamma^2}{j\omega CR_k}$$

The solution for Equation 4 is based upon:

$$I_{\mu,\mu+1}=I \sin p\mu \quad (5)$$

It follows therefrom for the dominant wave of propagation that:

$$c=\cos p \quad (6)$$

and from the boundary condition for $\mu=n$ that:

$$p=\frac{\pi}{n} \quad (7)$$

Assuming that the frequency is sufficiently high so that $$\frac{2}{\omega L}\left(R_s-R_k \cos \frac{\pi}{n}\right)<1$$

the propagation constant ($\gamma$) results as:

$$\gamma=j\omega\sqrt{LC}\left[1-\frac{j}{\omega L}\left(R_s-R_k \cos \frac{\pi}{n}\right)\right] \quad (8)$$

and the attenuation constant ($\alpha$) as:

$$\alpha=Re(\gamma)=\frac{Re\left(R_s-R_k \cos \frac{\pi}{n}\right)}{\sqrt{\frac{L'}{C}}} \quad (9)$$

This Equation 9, which expresses an essential consideration and feature of our invention, is indicative of the fact that for any given number $n$ of layers the attenuation has the lowest value and maintains this same value versus frequency, if the real (resistive) component of the transmission impedance $R_s$ is equal to the real component of the coupling impedance $R_k$.

Figure 3:
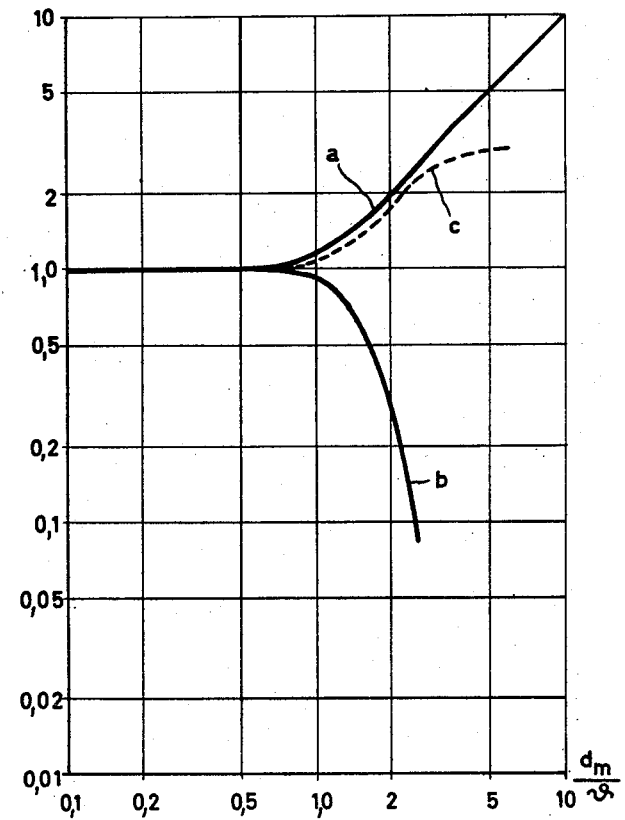
Figure 7:
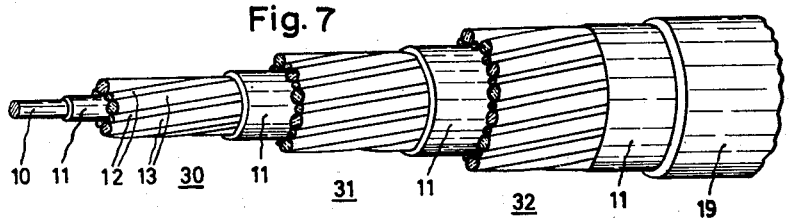
Figs. 7 and 9 show perspectively two wave-guide cables corresponding to the designs shown in Figs. 4, 5.

With continuous or nearly continuous layers of lamination, such an equality of the two impedance components can be obtained only as long as the lamination thickness is small relative to that of the equivalent conductance layer. In Fig. 3, curve $a$ represents the dependence of transmission impedance $R_s$ and curve $b$ the dependence of the coupling impedance $R_k$ upon the ratio of metal-lamination thickness $d_m$ to the equivalent conductance layer-thickness $\vartheta$ and hence also in dependence upon the frequency. Normally, and as is apparent from the diagram, the two curves $a$ and $b$ would be coincident only if the metal-lamination thickness $d_m$ is small in comparison with the conductance-layer thickness $\vartheta$; but according to the invention the coupling impedance $R_k$ is given substantially the same frequency response as the high-frequency impedance $R_s$ so that curve $b$ is modified to about the shape of the curve $c$.

According to another feature of our invention, such coincidence or approximate coincidence of coupling impedance $R_k$ and transmisison impedance $R_s$ is obtained by composing the wave transmisison line of mutually spaced conductance-layers which are each formed by a multiplicity of strands or wire extending substantially in the longitudinal direction, that are spaced from one another and have a thickness equal to, or preferably larger than, the equivalent conductance-layer thickness at the highest frequency to be transmitted. It is further of advantage to make the mutual spacing of the individual conductors in each layer and the spacing between the adjacent conductor layers at least equal to, or even larger in comparison with, the thickness of the conductors.

Such a wave-guide is distinct by considerably thicker conductors and a considerably wider spacing between the conductors as compared with the known laminated transmission lines having completely closed and dense laminations, or having laminations formed by thin insulated wires tightly packed side by side. Such transmission lines according to the invention represent bunched or creel-type wave guides and hence are hereinafter referred to as bunched-layer wave guides.

For reducing attenuation by dissipation losses, the conductors are preferably separated from each other by dielectric material of a small dielectric constant. For instance, polystyrol, polyethylene and the like synthetic dielectrics are used for this purpose, if desired in the form of foam or sponge material. The individual insulating layers may also be given respectively different dielectric constants, for instance for modifying the phase position of the currents in the different conductor layers.

The above-mentioned features are embodied in the bunched wave-guide lines shown in Figs. 4 to 6.

Each of the transmission lines according to Figs. 4 to 6 comprises individual conductors of relatively large mutual spacing insulated from each other to obtain the desired coincidence in frequency response of the two impedances. In all these embodiments, the conductors are not insulated individually but are applied as bare conductors and are mutually insulated by additional insulating members separately roped together with the conductors.

The bunched line according to Fig. 4 consists essentially of a cable composed of a central core 10, a number of concentric insulating layers 11, and a number of concentric layers formed of thin bare conductors 12 alternating with strands 13 of insulating material. The core 10 consists preferably of good-conducting material such as copper, and may then also be used for the supply of power current to a remote amplifier station. However, the core 10 may also consist of insulating material, preferably a material of sufficient tensile strength to be pull-resistant. The closed insulating layers 11 are preferably formed of open or closed foil-tape windings of polystyrol, polyethylene or the like synthetic material. The insulating wires or strands 13 may likewise be made of polystyrol or polyethylene; but they may also consist of an electrically insulating or semiconducting magnetizable material. The bunched-conductor cable thus built-up, is covered with a waterproof sheath (not shown) of lead, aluminum or the like, or is protectively sheathed in insulating material. Such a cable can be made by roping methods on conventional cable forming machines which can readily be adapted to the desired bunched-conductor design. The electrical and the corresponding mechanical dimensions of the cable components, of course, are in accordance with the explanations previously presented, and this applies also to the embodiments described below.

The bunched-conductor line according to Fig. 5 differs from that of Fig. 4 in that additional conductive layers 14 are arranged between the sequential layers of conductors 12. The spacing of the additional layers 14 from the layers of conductors 12 is large in comparison with the thickness of the conductors 12. Furthermore, the thickness of the conducting intermediate layers 14 is preferably made smaller than the thickness of the individual conductors 12. The desired spacing of the thin conducting intermediate layers 14 from the conductor layers 12 is secured by insulating layers 15 and 16 which are located below and above the layers of conductors 12. We prefer forming the conducting intermediate layers 14 from metal foils that are insulated on both sides. The intermediate layers 14 may also consist of a magnetizable material of slight hysteresis losses and slight eddy-current losses. This has the effect of increasing the characteristic impedance of the transmission line, thus further reducing its attenuation.

In the embodiment of Fig. 6 the bare conductors 12 are mutually insulated and kept spaced from each other by means of layers 17 which are formed of foam material and are located between the conductor layers. The layers of foam material have grooves 18 engaging and positioning the conductors. The resiliency of the foam material can be utilized for pressing the bare conductors into the foam material so that it is not necessary to machine or mold the grooves into the foam layers. Such a cable is preferably made by pressing the conductors during the cabling operation into the next lower layer of foam material, for instance by passing the layer of conductors, being roped on the machine, through a nippel or through profile rollers. Such a cable may comprise, for instance, 631 conductors, each having a diameter of 0.1 mm. The design of the cable may be normal and may be formed of 14 roped layers having consecutively 6, 12, 18, 24, 30, 36, 42, 54, 60, 72, 78 and 84 individual conductors. A tape of foam material having 0.5 to 0.8 mm. thickness is run onto the cable structure between the individual conductor layers. During the cabling operation the foam-material layers including the conductors may be compressed so that the foam material assumes considerable density, particularly at the locations of the conductors. For cabling the fourteen conductor layers, a series-type cabling machine may be used which can be given a very simple design since the conductors are cabled without reverse rotation. Since, with the lengths of material usual in cable manufacture, the thin conductors require only small supply coils, a cabling machine of normal dimensions can be used even if a relatively large number of wire coils is needed.

The effect afforded by the invention, that is by the mutual adaptation of the real components of coupling impedance and transmission impedance, may be physically explained by the fact that this adaptation permits the individual conductors to build up an effective magnetic field around themselves so that a virtually constant current density is produced over the entire periphery of the individual conductor. This effect can be aided by inductively loading the individual conductors or a portion thereof. To this end, and according to another feature of our invention, we cover the individual conductors with a fully or almost fully closed layer of ferromagnetic material which may be placed upon the conductor by extrusion molding or in form of a tape winding. The magnetizable material used for this purpose should have smallest possible losses as is the case with pure iron powder or ferrite powder. Such a transmission line may be given the same design as is illustrated in Figs. 4 to 9, except that the individual conductors are coated with magnetizable material. Another way is to embed the conductors of the entire bunched-conductor cable in a magnetizable material, such as a paste formed of a mixture of thermoplastic insulating material and magnetizable powder. Such a cable may be given a design as described with reference to Fig. 6, except that the material 17 is formed of the just-mentioned mixture. The inductive loading of the individual conductor has the further advantage that within each layer the mutual spacing of the conductors can be reduced and, if desired, can likewise be kept small relative to the conductor thickness.

In the case of wave-guide lines with coaxial layers of conductors as described above, the conductors are preferably given a helical course, preferably in the form of rope layers. This facilitates manufacturing the transmission line by conventional cabling methods and also increases the flexibility of the line. Thus, in Fig. 7, the wave-guide line has three rope layers 30, 31, 32, each composed of thin bare metal wires 12 and intermediate insulating strands in accordance with Figs. 3 and 4. The conductor layers are separated by insulating layers 11, and the line has a central core 10 and a protective sheath 19 also as described above. The individual conductors and insulating strands in this embodiment have all the same sense of helical pitch and the same, or about the same length of pitch.

Figure 8:
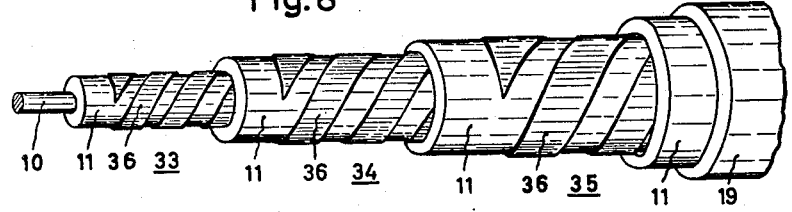
Fig. 8 shows in perspective another embodiment with helical conductor tapes.
Figure 9:
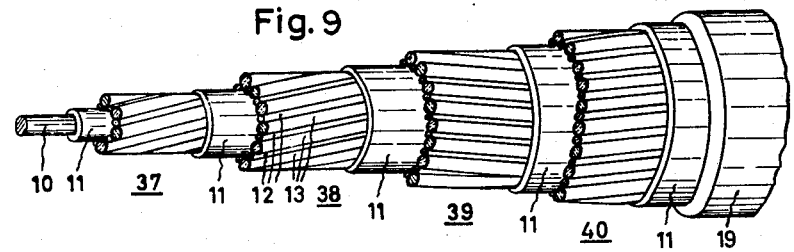

In a helical construction it is also possible to form the conductor layers of the wave-guide line of helically wound metal tapes with a gap between adjacent turns of the helix. This is shown in Fig. 8. The illustrated line has three conductor layers 33, 34, 35 each formed by a thin metal tape 36 helically wound with a gap between adjacent turns. The insulating layers 11 are thicker than in the wave-guide lines according to Figs. 4 and 5.

With a helical arrangement of the individual conductors the sense of twist and the length of each helical turn of the individual conductors in the various layers can be so chosen that the coupling effects between non-adjacent conductors are reduced to a no longer disturbing magnitude. Preferably, the conductors in outer conductor layers are given the same sense of twist and the same or approximately the same pitch length in order to avoid in this manner the occurrence of axial magnetic fields outside of the individual elementary wave guides and to obtain the same propagation magnitude in all elementary wave guides. By a corresponding selection of the pitch or turn length it is also possible to have the currents of all conductors in phase or approximately in phase with each other. This is preferably done by giving the pitch length a finely graduated and progressive variation from layer to layer and, if desired, by also reversing the sense of pitch. The embodiment shown in Fig. 9 incorporates these features. The illustrated wave-guide line has four layers 37, 38, 39, 40 each composed of bare conductor wires 12 and insulating strands 13 as described above with reference to Figs. 4 and 5. The conductors and insulating strands in layers 37, 38 and 40 have a left-hand twist, while those in layer 39 have right-hand twist. The turn or pitch lengths in the respective layers are different. For instance, the conductors and insulating strands in the layer 38 are cabled with a longer length of the helical turns than applied to the layer 37.

Transmission lines according to the invention, having preferably the conductors arranged in coaxial layers and cabled with a uniform length of helical pitch, can be used for transmission of messages, similar to a coaxial cable, with circular excitation and polarization. According to another feature of the invention, the wave transmission line is used to advantage for incorporating it into several transmission circuits. One way of doing this is to operate the conductors within the transmission line cross section in two mutually perpendicular planes of polarization. To this end, the bunches of conductors located on the two sides of the $x$-plane are connected to form part of one transmission circuit, and the respective bunches of conductors located on the two sides of the $y$-plane form part of a second transmission circuit. The embodiment illustrated in Fig. 10 exemplifies a cable according to the invention suitable for such purposes.

According to Fig. 10 the transmission line is subdivided in the $x$-plane, as well as in the $y$-plane. Hence there are four mutually isolated sectors, 1, 2, 3 and 4, each having a cross section covering one quarter of the full circle. As a result, the transmission circuit $L_x$ is formed by the two sectors ¼ and ⅔ and by the transformers $U_1$ and $U_2$ connected thereto. The transmission circuit $L_y$ is branched off from the center taps of the two transformers $U_1$ and $U_2$. In such a connection any cross-talk producing couplings that may occur in local and remote transmission due to interior irregularities of the laminated transmission line can be eliminated to a large extent by excluding a few individual conductors from the coupling connection. In this manner, the true position of the planes of polarization that have accidentally departed from the correct perpendicular relation to each other, can be reestablished experimentally, that is by a number of tests. In certain cases it is also possible to utilize the concentrically arranged layers of conductors, aside from the above mentioned two planes of polarization, for a third transmission circuit to be operated by coaxial or circular excitation. To this end, each of the four sectors 1 to 4 is radially subdivided into two segments, and the inner segments versus the outer segments are used for the third transmission circuit, that is for the third group of messages to be transmitted.

In a wave transmission line according to Fig. 10 the four sectors 1 to 4 may be manufactured individually. Instead, when manufacturing the entire transmission line from layers of individual conductors, the mutual spacing of the individual conductors may be so determined that the desired sectors, as illustrated, will result. For connecting the transformers $U_1$ and $U_2$, all or only some of the individual wires within the above-mentioned sectors may have their respective ends connected with each other.

It will be apparent to those skilled in the art that the invention is not limited to the embodiments particularly illustrated and described in this specification. For instance, the wave-guide lines according to the invention may be given a cross section departing from the circular shape. In all embodiments with layers of wires, the illustrated round wires may be replaced by wires of a different cross section, for instance tapes. Similarly it is also possible to depart from the illustrated embodiment as regards the mutual insulation of the individual conductors and conductor layers. In the embodiments according to Figs. 4 and 5, the bare conductors may also be given equal or even larger thickness than the strands 13 of insulating material. In this case, it is desirable to dispose between the adjacent conductors of the same layer several insulating strands, or insulating strands of a flat cross section in order to obtain the desired mutual spacing between the conductors. Furthermore, several bunched wave-guide lines can be cabled together to form a single cable core, and in such a cable the individual bunches may be shielded or unshielded depending upon the particular purpose. As mentioned, the high-frequency transmission lines according to the invention are provided with a waterproof sheath of metal or of nonmetallic material and, if desired, may be equipped with further protective coats. They are applicable as underground, air and sea cables and also as cables within telephone exchanges, or in stations for wireless transmission and for various other high-frequency transmission purposes.

We claim:

A high-frequency wave-guide line for transmitting a given frequency band, comprising a coaxial cable structure having a multiplicity of substantially cylindrical conductor layers and dielectric layers alternating with each other, each of said conductor layers being formed of a layer of individual conductors extending helically about the cable axis and having a thickness at least equal to that of the equivalent conductance layer at the highest frequency of said band, said individual conductors having different directions of twist in respectively different ones of said conductor layers, each two adjacent ones of said conductor layers forming with the intermediate dielectric layer an elementary wave guide, the individual conductors in each conductor layer having a mutual spacing and a helical arrangement at which the coupling impedance of said elementary wave guides is approximately equal to the transmission impedance of each conductor layer throughout said frequency band, whereby the attenuation constant of said elementary wave guides corresponds to the equation $$\alpha = \frac{Re\left(R_s - R_k \cos \frac{\pi}{n}\right)}{\sqrt{\frac{L}{C}}}$$

wherein $\alpha$ is the attenuation constant, $R_s$ is the complex value of said transmission impedance, $R_k$ is the coupling impedance, $Re$ is an operator indicating that only the real portion of the quantity it precedes is to be considered, $n$ is the number of conductor layers, L is the inductance, and C the capacitance of the elementary wave guide.

References Cited in the file of this patent

UNITED STATES PATENTS

| | | |
|---|---|---|
| 2,450,429 | Henning | Oct. 5, 1948 |
| 2,769,148 | Clogston | Oct. 30, 1956 |
| 2,769,149 | Kreer | Oct. 30, 1956 |

FOREIGN PATENTS

| | | |
|---|---|---|
| 151,466 | Australia | May 18, 1953 |